W. W. PARMENTER

POWER FRAME.

APPLICATION FILED NOV. 1, 1918.

Reissued Mar. 11, 1919.

14,609.

3 SHEETS—SHEET 1.

Witness

Inventor

William W. Parmenter

By Stuart C. Barnes

Attorney

W. W. PARMENTER.

POWER FRAME.

APPLICATION FILED NOV. 1, 1918.

Reissued Mar. 11, 1919.

14,609.

3 SHEETS—SHEET 2.

Witness

Inventor

William W. Parmenter

By Stuart G. Barnes

Attorney

W. W. PARMENTER.
POWER FRAME.
APPLICATION FILED NOV. 1, 1918.

Reissued Mar. 11, 1919.

14,609.
3 SHEETS—SHEET 3.

Witness

Inventor
William W. Parmenter
By Stuart B. Barnes
Attorney

UNITED STATES PATENT OFFICE.

WILLIAM W. PARMENTER, OF REDFORD, MICHIGAN.

POWER-FRAME.

14,609. Specification of Reissued Letters Patent. Reissued Mar. 11, 1919.

Original No. 1,269,736, dated June 18, 1918, Serial No. 182,270, filed July 23, 1917. Application for reissue filed November 1, 1918. Serial No. 260,754.

*To all whom it may concern:*

Be it known that I, WILLIAM WESLEY PARMENTER, a citizen of the United States of America, residing at Redford, in the county of Wayne and State of Michigan, have invented certain new and useful Improvements in Power-Frames, of which the following is a specification, reference being had therein to the accompanying drawings.

This invention relates to a power frame and has for its object the production of a simple and efficient power frame which is adapted to be used in connection with automobiles or other motor vehicles whereby power may be obtained and transmitted from the rear drive wheels of the motor vehicle.

Another object of this invention is the production of a simple and efficient power frame which is light in construction and upon which may be easily and efficiently attached a saw frame or other machine which is adapted to be driven from the drive wheels of a motor vehicle.

With these and other objects in view, this invention consists of certain novel constructions, combinations and arrangement of parts as will be hereinafter fully described and claimed.

Figure 1:
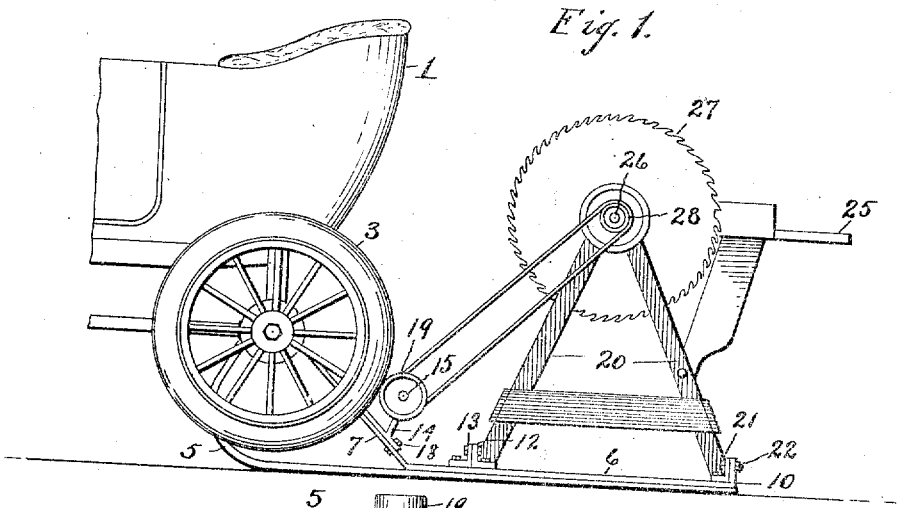
Figure 1 is a side elevation of the power attachment shown coöperating with the drive wheels of a motor vehicle.

By referring to the drawings it will be seen that 1 designates the body of the automobile which is provided with the usual rear drive axle 2. This axle 2 supports the usual rear drive wheels 3.

A power frame is adapted to coöperate with the rear axle 2 of the automobile 1 and this frame comprises a pair of bottom runners 4. The runners are of channel iron construction and are provided with upwardly curved forward ends 5 as shown clearly in Figs. 2 and 3.

Figure 7:
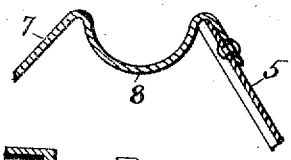
Fig. 7 is a fragmentary sectional view taken on line 7—7 of Fig. 4.
Figure 8:
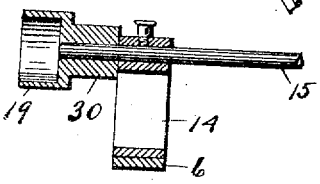
Fig. 8 is a section taken on line 8—8 of Fig. 4.
Figure 10:
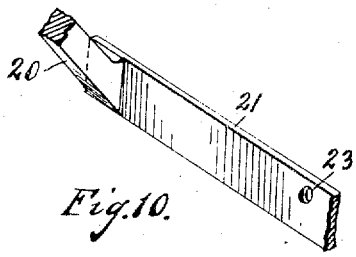
Fig. 10 is a detail perspective of one corner of the machine frame which is adapted to rest upon the power frame.
Figure 6:
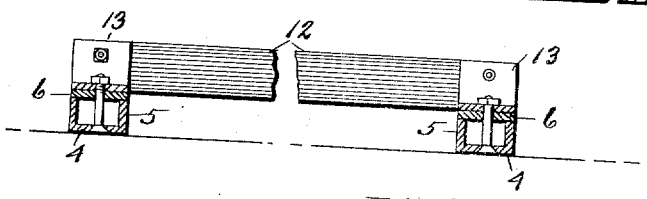
Fig. 6 is a section taken on line 6—6 of Fig. 4.

These runners 4 are adapted to be arranged in spaced, parallel relations, and each runner carries a strap plate 6 upon the top edge thereof as shown clearly in Fig. 6 of the drawings. These strap plates 6 are provided with upwardly inclined forward ends 7 which forward ends are provided with cradle-sockets 8. The extremity of these cradle-sockets 8 overhanging the ends 5 as shown in Fig. 7 and being riveted or otherwise permanently secured to the upper ends of the upturned ends 5. Suitable rivets 9 are employed for firmly holding thereby plates 6 in engagement with the channel irons 4.

Figure 4:
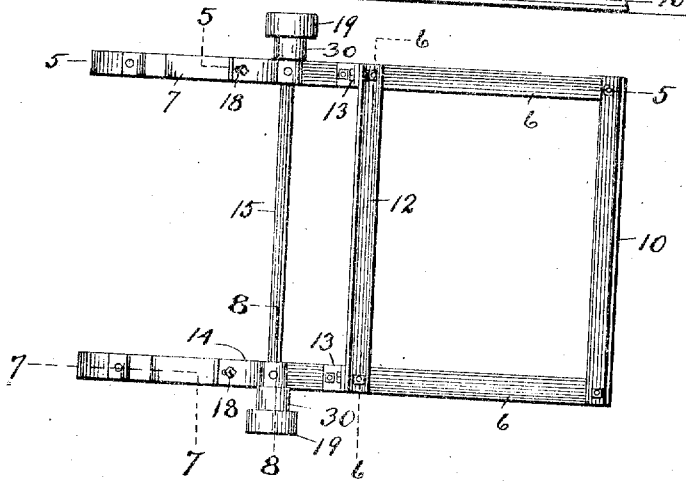
Fig. 4 is a top plan view of the power frame.
Figure 5:
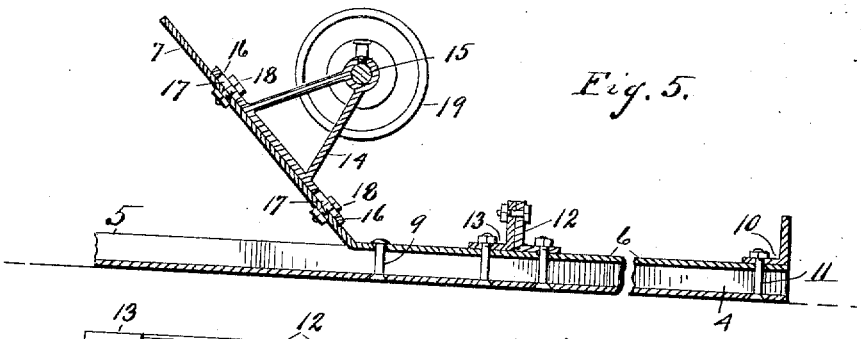
Fig. 5 is a section taken on line 5—5 of Fig. 4.

An end angle plate 10 is secured to the rear ends of the strap plates 6 by means of the bolts 11 which pass therethrough and which also extend through the channel runners 4. A transversely extending angle plate 12 is secured to the top of the plates 6 and faces angle plate 10 as shown clearly in Figs. 4 and 5 of the drawings, the angle iron 12 is braced by means of the angle braces 13 which engage the rear of the angle plate 12.

A power shaft supporting bracket 14 is carried by the upwardly inclined end 7 of each plate 6 and these brackets 14 support a power shaft 15. Each bracket 14 is provided with laterally extending feet 16 which feet are provided with elongated apertures 17 for receiving securing bolts 18 carried by the ends 7. It should be understood that these brackets 14 may be adjusted to a proper position for holding the friction wheels 19 in proper engagement with the tires of the wheels 3. These friction wheels 19 are carried on the shaft 15 and are adapted to frictionally engage the wheel 3 whereby power may be transmitted through said wheels 19 to the shaft 15 from the wheels 3.

The machine frame 20 is supported upon the power frame and may be of any suitable or desired construction without departing from the spirit of the invention. This machine frame 20 is provided with a plurality of converging, supporting legs which supporting legs are braced at their lower ends by means of the transversely extending plates 21. These plates 21 fit snugly against the angle plates 10 and 12. In order that the power frame may efficiently hold the machine frame against lateral movement, a securing bolt 22 is passed through the aperture 23 formed in one of the plates 21 and through the aperture 24 formed in the angle plate 10. There of course will be very little lateral strain upon the machine frame 20, and this securing bolt 22 will be sufficient to hold the frame 20 against lateral shifting movement.

Figure 2:
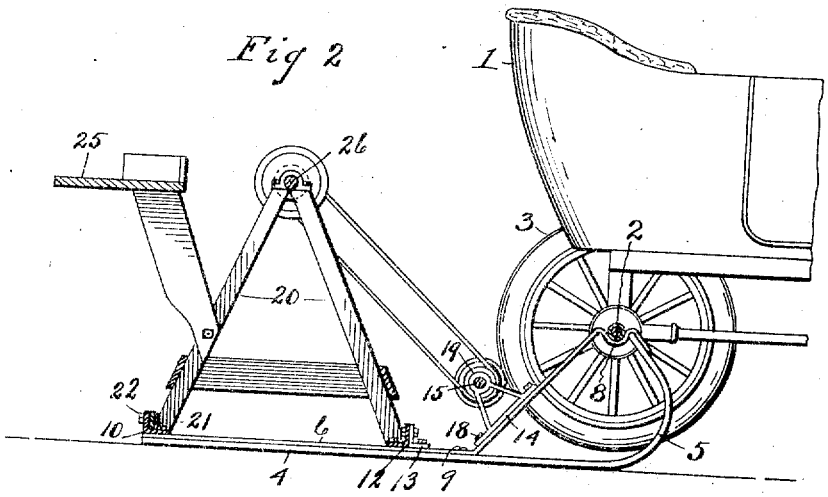
Fig. 2 is a central, longitudinal section of the power frame shown connected to an automobile, the drive axle thereof being shown in section.
Figure 9:
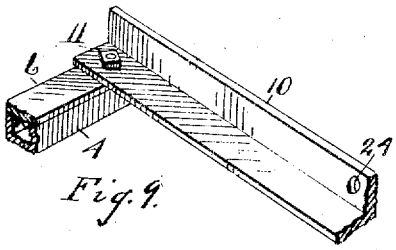
Fig. 9 is a detail fragmentary, perspective view of one corner of the power frame.

The frame 20 is provided with a suitable table 25 and a shaft 26 is supported upon the top 20 as shown in Fig. 2 of the drawing. This shaft 26 is adapted to support a saw 27 as shown in Fig. 1, and a drive pulley 28 is also carried by this shaft 26, a suitable drive belt passes over the pulley 28 and also passes over one of the pulleys 30 formed upon one of the friction wheels 19.

Figure 3:
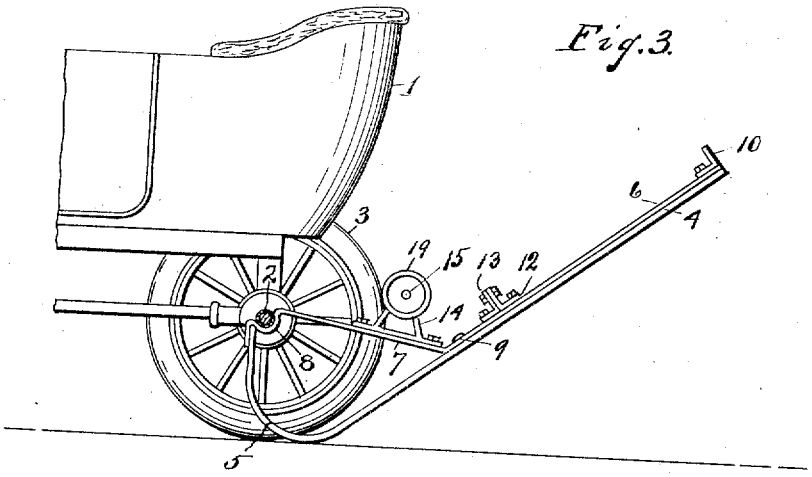
Fig. 3 is a side elevation of an automobile, the rear axle being shown in section, the power frame also being shown in a position ready to lift the rear axle and move the drive wheels out of engagement with the ground.

When it is desired to operate the saw or other machine mechanism which may be substituted for the saw, a power frame is placed in the position such as is illustrated in Fig. 3 of the drawings in order that the cradle-portion 8 may fit under the axle 2. After the frame has been placed or forced into the position shown in Fig. 3, the outer end of the power frame may be forced downwardly thereby moving and lifting the axle 2 upwardly and relieving the wheels from the ground, this movement is possible, due to the rocking action and leverage which is obtained by the power frame when forcing the same downwardly. The friction wheels 19 may be adjusted into frictional engagement with the wheels 3, and by attaching th machine frame 20 upon the power frame as above described, and placing the belt 29 over the pulleys 28 and 30, power may be transmitted from the drive wheels of the motor vehicle to the shaft 26.

By comparing Figs. 1, 2 and 3 it will be seen that the axle and the load, when the frame is swung completely down, are thrown past the vertical line through the point on which the frame begins to fulcrum when the frame is raised to release the car wheels. Of course, when the load passes this vertical line through this point it swings on a descending arc and hence holds the frame down and the rear wheels raised off the ground.

What I claim is:

1. A power frame of the class described comprising a number of side rails having upturned inner ends, a strap plate carried by said rails and provided with upwardly extending end portions, said end portions provided with a cradle-portion at the upper end thereof, said cradle-portion adapted to fit under the axle of a motor vehicle for supporting the same above its normal level, a power shaft, and friction wheels carried by said power shaft and adapted to frictionally engage the wheels of a motor vehicle with which said device is adapted to be used.

2. A power frame of the class described, comprising a plurality of rails, said rails provided with upwardly curved ends, cradle-portions supported upon the ends of said rails and adapted to fit under the axle of a motor vehicle whereby the axle of a motor vehicle will be lifted as said frame is swung upon said curved ends, a power shaft, friction drive wheels carried by said power shaft and adapted to frictionally engage the drive wheels of a motor vehicle.

3. A power frame of the class described, comprising a plurality of rails, said rails provided with upwardly curved ends, cradle-portions supported upon the ends of said rails and adapted to fit under the axle of a motor vehicle whereby the axle of a motor vehicle will be lifted as said frame is swung upon said curved ends, a power shaft, friction drive wheels carried by said power shaft and adapted to frictionally engage said drive wheels of a motor vehicle, a belt pulley secured to said power shaft, a machine frame detachably supported upon said power frame, provided with a rotary member, and means coöperating with said belt pulley for operating said rotary member of said machine frame.

4. A power frame of the class described comprising a plurality of rails, said rails comprising curved forward ends, strap plates carried by said rails and provided with cradle-portions at their upper ends, said strap plates provided with upwardly inclined forward ends, a plurality of brackets detachably mounted upon said inclined ends, a power shaft carried by said brackets, friction wheels carried by said power shaft and adapted to engage the drive wheels of a motor vehicle, a belt pulley secured to said power shaft, a machine frame supported upon said power frame, a machine shaft carried by said machine frame, a pulley carried by said machine shaft, and a belt on said belt pulley of the power shaft and said pulley of the machine shaft.

5. A power frame of the class described comprising a plurality of rails, driving means carried by said rails and adapted to engage the drive wheels of a motor vehicle, a plurality of transversely extending angle irons carried by said rails, and a machine frame seated upon said rails and held between said angle irons.

6. A power frame of the class described comprising a plurality of rails, driving means carried by said rails and adapted to engage the drive wheels of a motor vehicle, a plurality of transversely extending angle irons carried by said rails, a machine frame seated upon said rails and held between said angle irons, said machine frame comprising a plurality of legs, a tie plate connecting some of said legs, and means for anchoring said tie plate to one of the angle irons of said power frame.

7. A power frame of the class described comprising a plurality of rails, driving means carried by said rails and adapted to engage the drive wheels of a motor vehicle, a plurality of transversely extending angle irons carried by said rails, a machine frame seated upon said rails and held between said angle irons, said machine frame comprising a plurality of legs, a tie plate connecting some of said legs, a bolt passing through one of said angle irons and through said tie plate for anchoring said machine frame upon said power frame.

8. Apparatus of the class described, comprising a plurality of rails joined together to form runners upon which the frame can fulcrum and strap plates inclined to the runners which are adapted to act as axle supports, the said strap plates and runners operating to raise the axle and throw it through the vertical line through the fulcrum of the frame in rising whereby the load holds the frame down and the axle raised, and one of more friction wheels journaled upon the frame and adapted to make contact with the wheel or wheels of the car.

9. Apparatus of the class described, comprising rails joined together to form a frame and provided with portions upon which the axle of a car may rest and portions upon which the frame may fulcrum arranged so that when the frame is swung down the load of the car passes the vertical line through the fulcrum of the frame in rising and holds the frame down and the axle raised, and one or more friction wheels adapted to make contact with the car wheel or wheels.

10. Apparatus of the class described, comprising a plurality of members joined together to form a frame having one or more friction wheels supported thereon and adapted to make contact with the rear wheels of an automobile, the said frame having a fulcrum portion adapted to rest upon the ground and the frame contacting the axle to raise the same but before the frame is prone upon the ground causing the axle to swing upon a descending arc which serves to keep the frame against the ground and the axle raised.

11. Apparatus of the class described, comprising a frame rockable upon bent runners and axle supports supported by said runners, the frame being rockable to raise a vehicle axle and cause it to swing on a descending arc before the frame reaches its lowermost position, whereby the frame is held in such lowermost position with the wheels attached to the axle off the ground.

12. Apparatus of the class described, comprising a frame rockable upon the ground and adapted to support an axle, the said frame operating when prone on the ground to throw the load over a center and thus hold the frame down and the axle in a raised position, and power transmitting devices carried on the frame to derive power from the axle when the frame is prone upon the ground.

13. A device of the character described, comprising a frame adapted to be fulcrumed near one end on the ground when uptilted, and an axle support on the frame adapted to be introduced under an automobile axle when the frame is uptilted, the axle support being within the base support of the frame when the latter is in normal position.

14. A device of the character described, comprising a frame adapted to be fulcrumed near one end on the ground when uptilted, and means on the frame near the fulcrumed end thereof for supporting an axle above normal level of the latter, adapted to be introduced under an axle when the frame is uptilted, the axle supporting means lying within the base of support of the frame when the latter is in normal, prone position.

15. Apparatus of the class described, comprising a frame rockable on the ground and provided with a place to carry an axle of a vehicle, and power transmitting devices carried on said frame for transmitting power from the rear axle of a vehicle, the said frame and the axle carrying place thereon being arranged with respect to the fulcrum point on which the frame will rock in beginning to rise so that when the frame is prone on the ground and the axle raised the frame will hold the load elevated without any other aid.

In witness whereof I have hereunto set my hand on the 10th day of October, 1918.

WILLIAM W. PARMENTER.